United States Patent Office 3,230,037
Patented Jan. 18, 1966

3,230,037
PRODUCTION OF A NEW DEHYDRATED AND
HIGHLY BASIC LEAD CARBONATE
Wilhelm Kunz, Cologne-Mulheim, Germany, assignor to
Lindgens & Sohne, Koln-Mulheim, Germany, a firm
No Drawing. Filed Dec. 28, 1961, Ser. No. 162,933
Claims priority, application Germany, Jan. 4, 1961,
L 37,868
4 Claims. (Cl. 23—71)

This invention relates to the production of a new dehydrated and highly basic lead carbonate.

The known basic lead carbonate which is referred to as white lead has approximately the composition $2PbCO_3 \cdot Pb(OH)_2$. It is substantially obtained by the simultaneous action of carbon dioxide and acetic acid vapor on metallic lead in the presence of air. Commercially available lead carbonate contains about 10.5 to 12.0% $CO_2$ and according to Ral 10.5 to 12.5% $CO_2$ and has a loss on ignition of 13 to 14%. Water vapor and $CO_2$ is split off from this known basic lead carbonate at temperatures in excess of 180° C. When processing this compound at tempeartures above 180° C., formation of bubbles may occur in the reaction mixture by the $CO_2$ split off. This behavior has been found to be disadvantageous when using the compound as a stabilizer of polyvinyl chloride compositions to make the compositions resistant to heat and light.

It is an object of this invention to provide a new highly basic lead carbonate which differs very considerably and surprisingly in its properties from the properties of the known basic lead carbonate.

The novel product of the invention is a dehydrated highly basic lead carbonate having the formula $PbCO_3PbO$

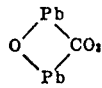

The $CO_2$ content of this compound is only about 9% and the loss on ignition is likewise about 9%.

The product of the invention may be prepared by thermal decomposition of water-containing lead carbonates having a $CO_2$ content of between 9% and a maximum of 16%. The reaction period at the same temperature increases as the $CO_2$ content increases. For example, commercially available white lead powder which always contains traces of acetate ions or mixtures of such white lead with anhydrous lead carbonate are heated to temperatures of 200° to 230° C. In doing so, $CO_2$ and water of hydration escape in stoichiometrical proportions. The decomposition starts at 150° C. but proceeds at a very low rate. Between 200 and 230° C., the decomposition proceeds at a rate which is interesting from the commercial point of view. Higher temperatures may be used but are not desirable for practical reasons. While higher temperatures result in a higher rate of decomposition, this higher rate has the disadvantage that exact control of the residence time in the reactor is difficult. It is possible theoretically to effect the reaction of the invention at temperatures of between 200° and 320° C., preferred being a range between 200° and 230° C.

Instead of using ordinary white lead powder, a lead oxide suspension suited to be further treated by the process of the invention may be prepared as follows:

$CO_2$ is introduced into a lead oxide suspension prepared with the use of water and acetic acid as the suspending agents until about 9% of $CO_2$ based on the resultant basic lead carbonate are absorbed. The reaction product is then heated to 200° to 230° C. After the filter cake has been dried (e.g., in a drying oven, a drying drum or in a fluid bed drier), the decomposition desired is brought about at a temperature of 220° C. and a residence time of 3 hours. When higher temperatures are used and the residence times are not exactly observed, products having a yellow to orange-yellow color and consisting, for example, of PbO and $Pb_3O_4$ are obtained.

The product obtained by the process of the invention shows the following differences as compared with ordinary white lead:

|  | Known white lead, percent | Dehydrated highly basic novel lead carbonate, percent |
|---|---|---|
| Total lead | ¹80 | ¹84.5 |
| PbO | ¹86 | ¹91 |
| Amount of PbO available as acceptor for buffering hydrochloric acid in known manner | ¹28 | ¹45 |

¹ About.

The last line of the table relates to the use of the compared products as stablizers in polyvinyl chloride or its copolymers or other high-polymeric chlorohydrocarbons such as chlorovinyl polymers and copolymers thereof.

Due to the increase in total lead or PbO content by 5% and the increase in the acceptor content by 50%, more efficient buffering of hydrochloric acid set free in the polymers is obtained as compared with the use of the known white lead compound. This reaction will chiefly take place when using lead carbonate as a heat and light stabilizer of high-polymeric chlorohydrocarbons, particularly polyvinyl chloride, and copolymers thereof and for the improvement of the electrical insulation characteristics of compositions of this type. When using the new dehydrated lead carbonate, the stabilization and insulation characteristics are considerably improved as compared with those obtained with the known white lead. The insulation characteristics of a polyvinyl chloride composition stabilized with the new product are clearly superior to those of a polyvinyl chloride composition stabilized with any of the known stabilizers. The thermal stability is improved by about 50% and is increased, for example, from about 300 minutes to 450 minutes.

The thermal stability of the compound of the invention is of particular commercial importance. For example, at high ejection temperatures of high-speed processing machines, $CO_2$ or water will not be split off from the lead carbonate even at temperatures in excess of 200° C. so that the risk of bubble formation (foaming) in the finished product and in the reaction mass is avoided. This is an outstanding advantage of the product of the invention. The lead carbonate of the invention is also particularly well suited as an additive of paints.

Example 1

Lead carbonate containing about 9% of $CO_2$ is prepared by introducing $CO_2$ into a suspension of lead oxide in water and acetic acid. The filter cake is freed from normal water and then heated to 220° C. One hundred grams of dry filter cake give 96.5 gms. of a white powder, 95% of which consist of the compound desired. The balance is incompletely decomposed starting product.

Example 2

One hundred gms. of lead oxide are thoroughly stirred with 220 ml. of tap water and 0.7 ml. of acetic acid (80%) or a corresponding amount of a water-soluble acetate. The suspension has a pH value of 9.6 which increases to about 6.5 to 7 when introducing 14 gms. of $CO_2$ while stirring. After filtration with suction on a porcelain suction filter, the filter cake is dried for about 5 to 6 hours at temperatures of 200° to 230° C. and subsequently ground.

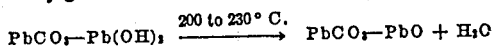

During the drying process, a yellow-colored product is intermediarily formed. However, the color of the product turns to white in the final stage. When using higher drying temperatures, the drying period must be reduced correspondingly to obtain the same product. There are obtained 109 grams of the dry finished product which contains 95% of the compound desired.

*Example 3*

The procedure is the same as in Example 2 except that drying is effected for about 9 hours at 200° C. The yield is the same as that obtained in Example 2.

*Example 4*

The procedure is the same as in Example 2 except that only 10.2% of $CO_2$ are introduced and drying is effected for 15 minutes at 300° C. Substantially 100% of the finished product consist of the compound desired, the yield being 109 grams.

*Example 5*

Dehydrated highly basic lead carbonate is prepared by the procedure described in Example 1 and used as an active pigment of paints formulated as follows:

67 parts of highly basic dehydrated lead carbonate
30 parts of linseed oil varnish
3 parts of white spirit The white paint obtained gives a coating film of higher hardness than that obtained with white lead. A paint of this type should be applied soon since it has only a limited shelf life due to the extremely high activity of the pigment.

What is claimed is:
1. The process for the production of white dehydrated highly basic lead carbonate having the formula $PbCO_3 \cdot PbO$, which comprises heating a product selected from the group consisting of white lead powder (approx. $(PbCO_3)_2 \cdot Pb(OH)_2$ and mixtures of white lead powder (approx. $(PbCO_3)_2 \cdot Pb(OH)_2$ with anhydrous lead carbonate ($PbCO_3$) to temperatures of between 200 and 320° C., whereby $CO_2$ and water of hydration are split off to form said dehydrated highly basic lead carbonate.

2. Process according to claim 1, which comprises heating said group member to a temperature of between 200 and 230° C.

3. A process for the production of white dehydrated highly basic lead carbonate having the formula $PbCO_3 \cdot PbO$, which comprises introducing $CO_2$ into an aqueous suspension of PbO containing a member selected from the group consisting of acetic acid and lead acetate until the $CO_2$ content of the reaction product amounts to from 9 to 16%, filtrating the reaction mixture, drying the filter cake thereby recovered to remove any free water remaining, and thereafter heating the filter cake to a temperature of between 200 and 320° C. whereby $CO_2$ and water of hydration are split off to form said dehydrated basic lead carbonate.

4. Process according to claim 3, wherein said heating is carried out until said dehydrated basic lead carbonate product has a $CO_2$ content of about 9%.

References Cited by the Examiner
UNITED STATES PATENTS
2,091,797   8/1937   Sessions _____ 23—71

FOREIGN PATENTS
500,961   2/1939   Great Britain.

OTHER REFERENCES
Chem. Abs., 52, 10789(d)—1958.
Chem. Abs., 42, 4480(b)—1948.

MAURICE A. BRINDISI, *Primary Examiner.*